United States Patent
Nanjiani et al.

(10) Patent No.: US 9,028,260 B2
(45) Date of Patent: May 12, 2015

(54) AUTOMATED QUIZ GENERATION SYSTEM

(75) Inventors: Nader Abbas Nanjiani, Coppell, TX (US); Matthew R. Kuhlke, San Francisco, CA (US); Manoj Mishra, Kolkata (IN); Balajee Ramakrishnananda, Tamil Nadu (IN)

(73) Assignee: Cisco Technology, Inc., San Jose, CA (US)

( * ) Notice: Subject to any disclaimer, the term of this patent is extended or adjusted under 35 U.S.C. 154(b) by 1254 days.

(21) Appl. No.: 12/240,064

(22) Filed: Sep. 29, 2008
(Under 37 CFR 1.47)

(65) Prior Publication Data

US 2010/0081120 A1   Apr. 1, 2010

(51) Int. Cl.
*G09B 7/00* (2006.01)
*G09B 7/02* (2006.01)
*H04L 29/06* (2006.01)

(52) U.S. Cl.
CPC ............ *G09B 7/02* (2013.01); *H04L 29/06034* (2013.01)

(58) Field of Classification Search
CPC ............ G06Q 30/02; G09B 7/00; G09B 7/02; G09B 7/07; G09B 7/073; A63F 13/12; H04L 29/06034
USPC ......... 434/350, 322, 323, 362, 365; 705/7.32; 463/40
See application file for complete search history.

(56) References Cited

U.S. PATENT DOCUMENTS

| | | | |
|---|---|---|---|
| 4,926,255 A | 5/1990 | Von Kohorn | 358/84 |
| 6,685,482 B2 | 2/2004 | Hopp et al. | 434/323 |
| 6,959,417 B2 | 10/2005 | Gupta | 715/513 |
| 7,377,785 B2* | 5/2008 | Ullman et al. | 434/323 |
| 7,386,453 B2* | 6/2008 | Polanyi et al. | 704/270 |
| 7,634,793 B2* | 12/2009 | Hunleth et al. | 725/54 |
| 2001/0053514 A1* | 12/2001 | Doi et al. | 434/350 |
| 2004/0128183 A1* | 7/2004 | Challey et al. | 705/10 |
| 2004/0137929 A1 | 7/2004 | Jones et al. | 455/517 |
| 2004/0205810 A1* | 10/2004 | Matheny et al. | 725/23 |
| 2005/0287509 A1* | 12/2005 | Mohler | 434/350 |
| 2007/0077975 A1 | 4/2007 | Warda | 463/9 |
| 2007/0300273 A1* | 12/2007 | Turner | 725/105 |
| 2008/0032277 A1* | 2/2008 | Maggio et al. | 434/362 |
| 2008/0209465 A1* | 8/2008 | Thomas et al. | 725/32 |
| 2008/0229352 A1* | 9/2008 | Pino et al. | 725/22 |

* cited by examiner

*Primary Examiner* — Peter Egloff

(57) ABSTRACT

In one embodiment, an apparatus may receive metadata that is associated with content. The metadata includes event descriptors that describe events included in the content. The apparatus may generate a question based on at least one of the event descriptors.

21 Claims, 3 Drawing Sheets

AUTOMATED QUIZ GENERATION SYSTEM

TECHNICAL FIELD

The present disclosure relates generally to quiz generation systems.

BACKGROUND

Real-time quizzing of audience members who view a broadcast of live or recorded events can be a fun and interactive experience. Events may occur in games, sports, political events, news, or any other occurrence. A quiz may include one or more questions and may test the knowledge of or poll the audience member. Systems exist to conduct real-time quizzing, testing, and polling of viewers and listeners.

Quizzes are written by an individual or a group of individuals either before or during the broadcast of the events. An individual who writes a question included in the quiz may need to be well-versed in the subject matter of the events.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

Figure 1:
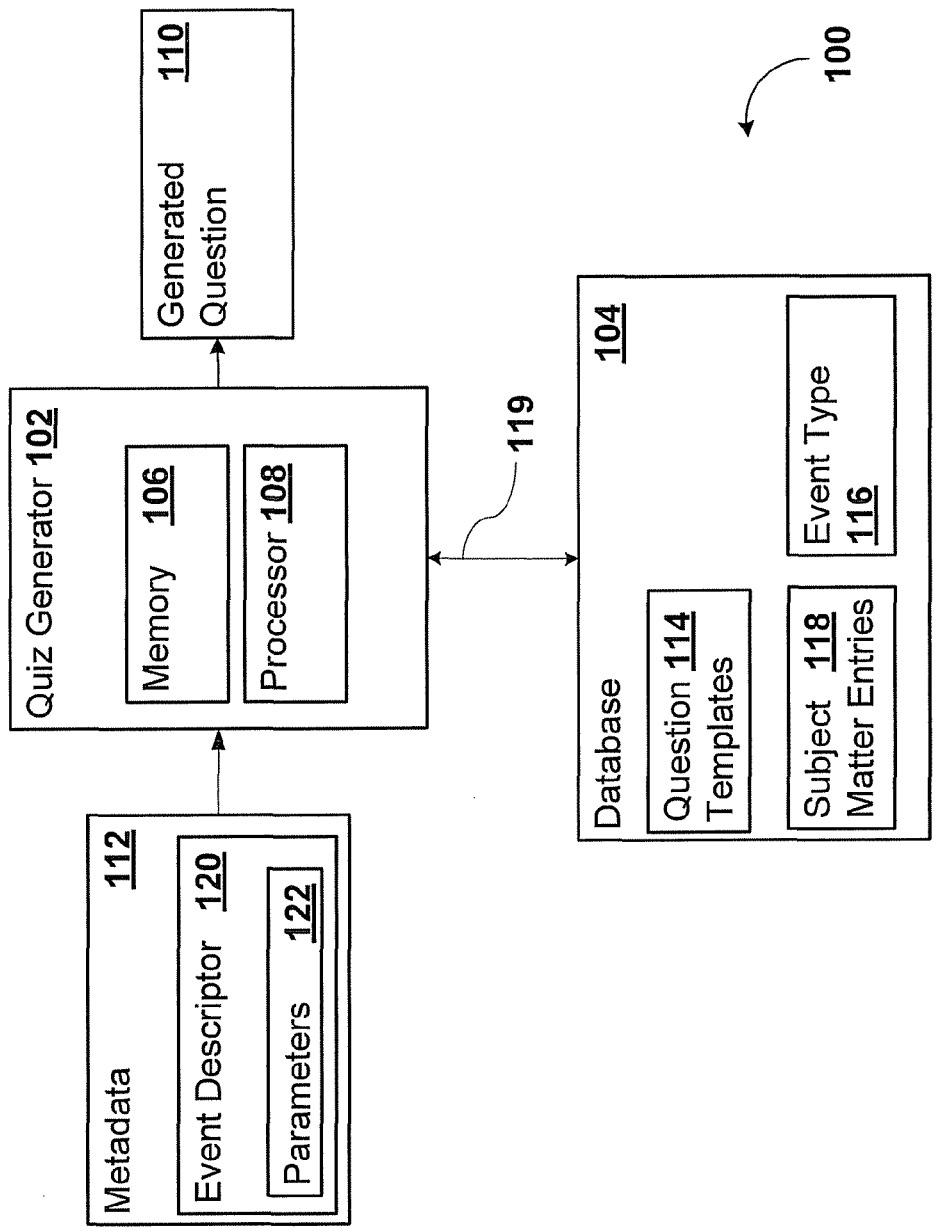
FIG. 1 illustrates one embodiment of a system for generating questions.

By way of introduction, the example embodiments described below include an apparatus, computer readable media, and a method for generating questions.

According to a first embodiment, an apparatus is provided. In one embodiment, an apparatus receives metadata that is associated with content. The metadata includes event descriptors that describe events included in the content. The apparatus generates a question based on at least one of the event descriptors.

In a second embodiment, logic encoded in a tangible media is provided. The logic when executed is operable to receive metadata associated with content. The metadata includes event descriptors that describe events included in the content. The logic when executed is further operable to generate a quiz that includes questions. Each of the questions corresponds to at least one of the event descriptors. The questions are generated from database entries retrieved from a database. At least one of the event descriptors includes a parameter value. At least one of the questions includes the parameter value.

In a third embodiment, a method is provided. Metadata is received that corresponds to content. The metadata includes event descriptors that describe events included in the content. At least one question is generated based on at least one of the event descriptors.

The present invention is defined by the following claims, and nothing in this section should be taken as a limitation on those claims. Further aspects and advantages of the invention are discussed below in conjunction with the example embodiments.

Example Embodiments

A question generator may generate questions in real-time from metadata, where the metadata describes events included in content. The content may include any work of authorship broadcast live or fixed in a tangible medium of expression, such games, movies, sport sporting events, political events, elections, financial events, and news. An event may be any identifiable occurrence included in the content. For example, an event may be a first down made during a football game, an attempted shot in basket ball, a win in a chess match, or a reference to particular topic during a political speech.

An audience member, such as viewer, reader, or listener of the content, may view and answer one or more of the questions while viewing, reading, or listening to the content. A system for generating the questions and retrieving answers from audience members may be separate from a system for broadcasting the content. For example, the audience member may view and answer questions with a web browser on a laptop while viewing a basketball game broadcast on a television over a cable television network. Alternately, the same system may be used for both generating the question and broadcasting the content. For example, an audience member may view the basketball game on the laptop as well as view and answer questions with the web browser. To generate questions from the metadata, the quiz generator may combine portions of the metadata with a database of related facts and questions.

Systems exist for adding metadata to content. For example, metadata corresponding to events is created for content such as sports and news. As that content is broadcast, the metadata is used to display information about events occurring in real-time in a news ticker or crawler, web headlines, and other forums. However, the metadata is not currently used to automatically generate quizzes. The metadata may be delivered at substantially the same time as the content. Consequently, a question generated from the metadata may be generated at substantially the same time as a related event occurs in the content.

FIG. 1 illustrates one embodiment of a system 100 for generating questions. The system 100 may include a quiz generator 102 and a database 104. The system 100 may include additional, different, or fewer components.

The quiz generator 102 may include a memory 106 and a processor 108. The memory 106 may be any now known, or later discovered, storage device. The memory 106 may be a non-volatile and/or volatile memory, such as a random access memory (RAM), a read-only memory (ROM), an erasable programmable read-only memory (EPROM), or flash memory. The memory 106 may include an optical, magnetic (hard-drive) or other memory device.

The processor 108 may be in communication with the memory 106. The processor 108 may also be in communication with additional components, such as a network interface. The processor 108 may be a general processor, central processing unit, server, application specific integrated circuit (ASIC), digital signal processor, field programmable gate array (FPGA), digital circuit, analog circuit, or combinations thereof. The processor 108 may be one or more processors or devices operable to generate questions 110 from metadata 112 based on question templates 114 included in the database 104.

The database 104 included in the system 100 may be a memory with any electronic collection of information stored in the memory. The information may be organized so that the information may be accessed, managed, and updated. Examples of a database 104 include but are not limited to a Relational Database Management System (RDBMS), an object-oriented database, an extensible markup language (XML) database, a file system, memory structures, or other now known or later developed database. The database 104 may use any type of memory and structure, such as a random access memory (RAM), a read-only memory (ROM), an erasable programmable read-only memory (EPROM), flash memory, optical memory, magnetic (hard-drive or tape) memory or other memory device.

The database 104 may include database entries. A database entry is information that may be retrieved from or stored in the database. The database entry may be accessed or looked-up using a unique key, such as a primary key value, a full path name, or a memory address. For example, the database entry may be a row in a table in an RDBMS. In other examples, the database entry may be stored across multiple locations in the database 104, such as across multiple tables in an RDBMS. A table in an RDBMS may include one or more columns. The database 104 may include a collection of databases.

The processor 108 may be operable to store database entries in the database and to retrieve database entries from the database. The database 104 may include different kinds of database entries, such as question templates 114, event types 116, and subject matter entries 118. The database may include fewer or more database entries. One or more database entries may be associated in the database with one or more other database entries. For example, question templates 114 may be associated with an event type 114.

Any method of associating database entries in a database, now known or later discovered, may be used. In some examples, a first database entry is associated with a second database entry by including a unique key in the second database entry to identify the first database entry. In other examples, the first database entry is associated with the second database entry by including a unique key in the first database entry to identify the second database entry. In still other examples, the database includes an association database entry, where the association database entry includes a unique key to identify the first database entry and a unique key to identify the second database entry.

The database 104 may be in communication with the quiz generator 102 over a network 119. The network 119 may be a Local Area Network (LAN), a Wireless Local Area Network (WLAN), a Wide Area Network (WAN), or any other now know or later developed communications network. Alternatively, the quiz generator 102 may include the database 104.

During operation, the processor 108 may generate the questions 110 based on the metadata 112 and/or on database entries included in the database 104. The metadata 112 is data about content. The content may include any work of authorship broadcast live or fixed in a tangible medium of expression, such games, movies, sport sporting events, political events, news, and web pages. The metadata 112 may include one or more event descriptors 120. An event descriptor 120 describes an event included in the content. An event may be any identifiable occurrence included in the content. For example, an event may be a first down made during a football game, an attempted shot in basket ball, a win in a chess match, or a reference to particular topic during a political speech. The metadata 112 may be in any format, such as extensible markup language (XML), name-value pair format, or some other format configurable to describe events.

The metadata 112 may be received while the content is broadcast or viewed and/or heard by an audience member. The metadata 112 may be received in a data stream. A data stream may be any sequence of digitally encoded coherent signals, such as packets of data or datapackets, used to transmit or receive information that is in transmission. A data stream may include streaming multimedia, which is constantly received by, and communicated to, an audience member while it is being delivered by a provider. The data stream may also be generated from inherently non-streaming media such as electronic books, Compact Disks (CDs), and audio recordings. In one example, a universal resource locator (URL) may indicate a source of the data stream. In other examples, any method of specifying a source of a data stream may be used.

The data stream may contain the metadata 112 and the content or just the metadata 112. If the data stream includes both, the quiz generator 102 may separate the metadata 112 from the content.

The event descriptor 120 may include parameters 122 that describe certain aspects of the event. For example, the parameters 122 may include a parameter describing the type of the event and parameters describing other aspects of the event that are specific to that type of event. The parameters 122 may be specified with XML elements and attributes and may be hierarchically arranged. As an illustration, an example event descriptor 120 may include:

```
<event>
    <type>completedGoal</type>
    <subject>basketball</subject>
    <homeTeam>Cisco</homeTeam>
    <guestTeam>ACME</guestTeam>
    <scorer>Cisco</scorer>
    <pointsScored>2</pointsScored>
    <homeScore>80</homeScore>
    <guestScore>78</guestScore>
</event>
```

The example event descriptor 120 indicates that a player for Cisco has just scored two points for Cisco in a basketball game between Cisco and ACME. The event descriptor 120 also indicates that Cisco is now in the lead with a score of 80 to 78.

The event descriptor 120 contains information about the event from which questions 110 may be generated. As long as the event descriptor 120 is in format recognizable by the quiz generator 102, the quiz generator 102 may generate a question 110 based on the event descriptor 120. If the metadata 112 is in some other format, the quiz generator 102 may be able to transform or convert the metadata 112 into a format recognizable by the quiz generator 102. For example, an extensible stylesheet language transform (XSLT) may transform the metadata 112 from one format to a second format, where the second format is recognizable by the quiz generator 102.

In one example of generating a question 110 based on the event descriptor 120, the quiz generator 102 may determine an event type 116 from the parameters 122 of the metadata 112. The event type 116 indicates a type of event described by the event descriptor 120. A generated question 110 may be specific to that event type 116. The event type 116 may be determined based on one parameter 122, such a "type" parameter or a combination of parameters 122, such as "type" and "subject." In the example event descriptor 120 given above, the event type 116 may be the concatenation of "basketball" and "completedGoal." In other examples, the event type 116 may be determined based on a combination of events and/or a combination of parameters in multiple events.

The quiz generator 102 may retrieve question templates 114 associated with the event type 116 from the database 104. A question template 114 includes a pattern text of a question. The question template 114 may include simple text, such as "Which team just scored a point?" Alternatively, or in addition, a question template 114 may include text with variables, such as "How many points did % scorer % just make?" Variables may be designated with any type of symbol such as "%," "$," "[," any other indicator, or any combination thereof. Where the question template 114 includes variables, the quiz generator 102 may replace the variables with values of corresponding parameters 122. For example, "% scorer %" may be replaced with the value of the corresponding "scorer" parameter 122. The quiz generator 102 may replace "% scorer %" with "Cisco" in the example event descriptor 120 above to generate a question 110 that reads "How many points did Cisco just make?"

In some examples, the quiz generator 102 may restrict which question templates 114 associated with the event type 116 are retrieved. The retrieved question templates 114 may be limited to those with either no variables or with variables that may be resolved. For example, if the event descriptor 120 did not contain a "scorer" parameter 122, then a question template 114 containing a "scorer" variable may not be retrieved. In another example, if the quiz generator 102 is configured to generate a determined number of questions 110, then that determined number of question templates 114 may be retrieved. In still another example, if the quiz generator 102 is configured to generate questions 110 of a certain type, such as multiple choice, true/false, short answer, or other question format, then question templates 114 of that certain type may be retrieved.

Where the question template 114 includes variables, the quiz generator 102 may replace the variables with subject matter information instead of, or in addition to, parameters 122. Subject matter information may include facts related to various subject matters. Subject matter information may include historical information related to the event described by the event descriptor 120, to the type of the event, to the subject matter, etc. For example, subject matter information may include historical information such as the number of attempted goals in a basketball game so far, the number of attempted goals by a certain player in the season, or the highest scoring player of all time. Subject matter information may also include current information, such as the names of the players on each team in a sport, statistics about each of those players, or other data. The subject matter information may be stored as subject matter entries 118 in the database 104.

The quiz generator 102 may update the subject matter entries 118 in the database 104 with the information received in the metadata 112. For example, if the subject matter entries 118 contain an entry for a highest scoring player for a given sport for the current season, that entry may be updated based on a player scoring points in a game described by the metadata 112.

The quiz generator 102 may include features specific to one or more subject matters to perform updates of the database 104 based on the metadata 112 or otherwise process information stored in or retrieved from the database 104. The quiz generator 102 may also include features specific to a subject matter that may not even use the database 104 to generate the question 110. Alternatively, or in addition, the quiz generator 102 may provide a general framework for processing information stored in or retrieved from the database 104. With the use of either the general framework or the specific features, a subject matter expert may author questions that may be used for future events related to that subject matter.

A general framework for replacing variables in a question template 114 with values stored as subject matter entries 118 may use any method now know or later discovered, for referencing database entries. For example, the variable may include a unique key, a Structured Query Language (SQL query), or an XML Path Language (XPath) expression. In one example, the question template 114 may include the text: "Is [/sports/basketball/current season/highest/scoring/team] the highest scoring team this season?" The quiz generator 102 may replace the text in brackets with the value matching the XPath expression included in the question template 114. The quiz generator 102 may determine the value by applying the XPath expression to the database 104.

The general framework may also generate general questions relating to the subject matter of the events and/or events. The subject matter may be explicitly specified in the metadata or determined from the metadata using any method of determining the subject matter of information. In the example event descriptor 120 given above, the subject matter is explicitly specified as "basketball" in a parameter of the event descriptor 120. The quiz generator 102 may retrieve question templates 114 that relate in some way to the subject matter from the database 104. For example, when the subject matter is "basketball," the quiz generator 102 may retrieve a question template 114 associated with "basketball" such as "Who invented basketball?" The quiz generator 102 may retrieve a question template 114 associated with a more general subject, such as "What is the most popular sport in the United States?"

Figure 2:
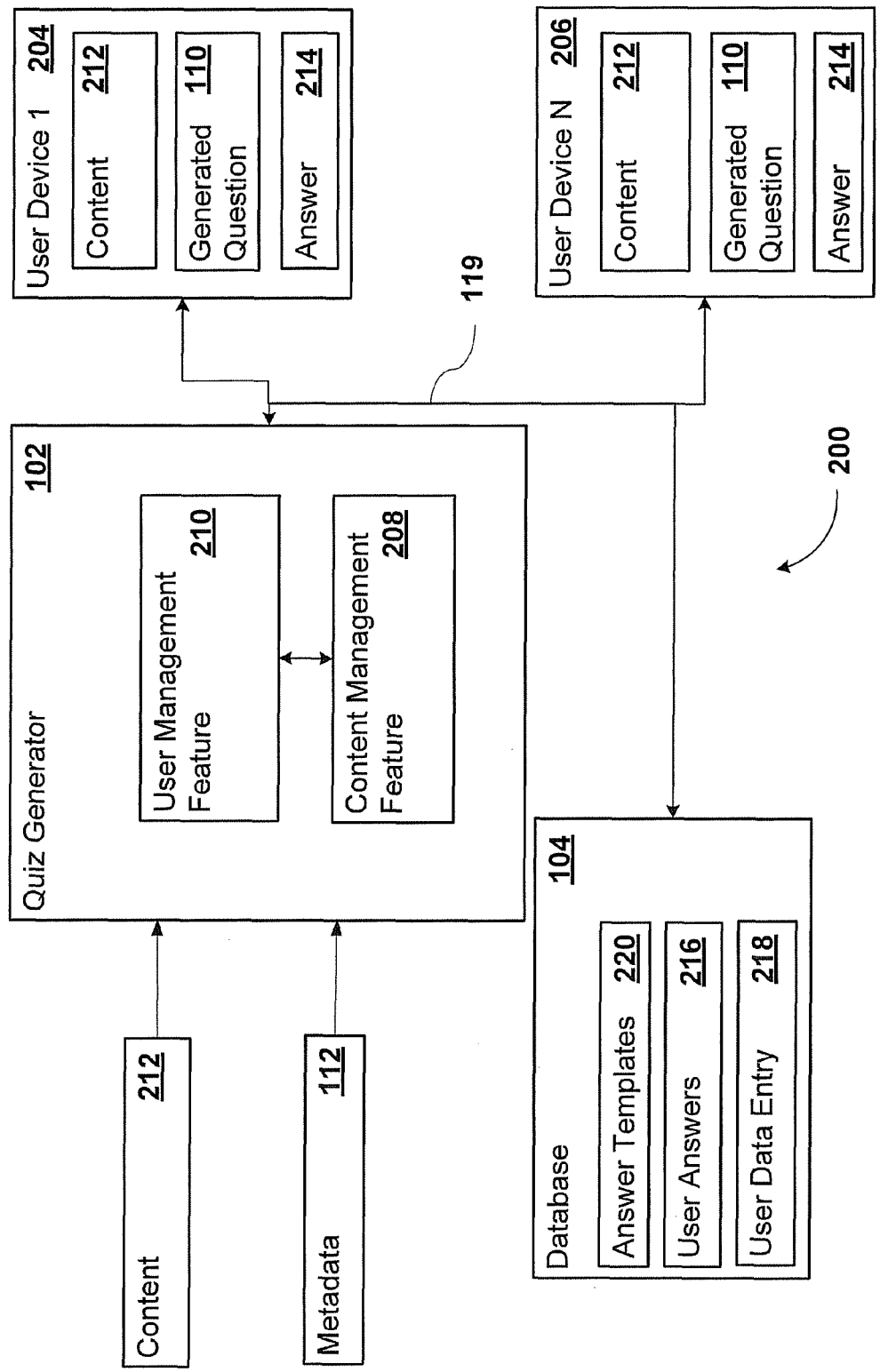
FIG. 2 illustrates one embodiment of a system for generating questions and obtaining answers that includes the quiz generator of FIG. 1.

FIG. 2 illustrates one embodiment of a system 200 for generating questions and obtaining answers that includes the quiz generator 102 of FIG. 1 or some other quiz generator 102. The system 200 may include the quiz generator 102, the database 104, and the network 119. The system 200 may include additional, different, or fewer components. The quiz generator 102 may be in communication with user devices, 204 and 206, over the network 119.

The user devices, 204 and 206, may be any networked device with which a user may interact now know or later developed, such as a personal computer, a mobile device, a laptop, a Personal Digital Assistant (PDA), a telephone, a cell phone, or a television.

The quiz generator 102 may include a content management feature 208 and a user management feature 210. The content management feature 208 may be operable to receive content 212 and to transmit the content 212 to the user devices 204 and 206. The content 212 may be received through a media stream. The content management feature 208 may also be operable to receive both the metadata 112 and the content 212 and to separate the metadata 112 from the content 212. In some examples, the content management feature 208 may be operable to transmit the same content 212 to each of the user devices 204 and 206. Alternatively or additionally, the content management feature 208 may be operable to transmit different portions of the content 212 to different user devices, 204 and 206.

The user management feature 210 may be operable to permit user registration, to control user interaction with the quiz generator 102, to coordinate interaction between users, to manage groups and/or communities of users, to score quizzes and/or answers, and to consolidate information provided by multiple users. For example, the user management feature 210 may transmit generated questions 110 to the user devices 204 and 206, receive user provided answers 214 from the user devices 204 and 206, and store the user provided answers 214 as user answers 216 in the database 104. Each of the user answers 216 may be associated with a user of the respective user device 204 or 206. For example, the user management feature 210 may determine a user's overall score on a quiz by evaluating the user answers 216 associated with that user. The user management feature 210 may determine the results of a poll or survey by analyzing and/or tabulating the user answers 216 provided by users participating in a poll. The user management feature 210 may determine the extent of user participation by analyzing how many user answers 216 were received for a particular generated question 110. The user management feature 210 may determine the winner in a contest between users on a particular quiz. The user management feature 210 may be further operable to store and retrieve a user's preferences or other information about the user in a user data entry 218 in the database 104. For example, one user may not want to receive any questions about basketball. In another example, a user may want to answer only certain types of questions, but not others (i.e., true/false questions, but not short answer).

As discussed above, the quiz generator 102 may be configured to receive a user provided answer 214 to a generated question 110. The quiz generator may also be operable to determine whether the answer is correct. The user management feature 210 may store the correctness of the answer 214 in the user answer 216 associated with the user and with the generated question 110.

Determining the correctness of the user provided answer 214 may depend on the type of question associated with the question template 114. Examples of question types include multiple choice, true/false, and short answer. Moreover, if the question is a poll or survey question, then there may be no correct answer. However, if the question is an opinion answer, the user management feature 210 may determine how the user provided answer 214 compares with other user provided answers 214. For example, the user management feature 210 may display a message like "30% of the users voted that Player A would not finish the season with 2000 rushing yards." The correct answer may be included in the question template 114 and/or in one or more associated answer templates 220.

An answer template 220 may provide a pattern text of a possible answer or the answer. The answer template 220 may include simple text, such as "Michael Jordan", "true", or "false". Alternatively, or in addition, an answer template 220 may include text with one or more variables, such as "% pointsScored %". If the answer template 220 includes variables, the quiz generator 102 may replace the variables with values of corresponding parameters 122 or with values of subject matter entries 118. For example, a question template 114 may be "How many points did % scorer % just make?" The associated answer template 220 may be "% pointsScored %". The quiz generator 102 may replace "% scorer %" with "Cisco" and the "% pointsScored %" with "2" when applied to the example event descriptor 120 above.

In addition to or instead of including an answer in a question template 114, the answer templates 220 may include possible answers from which the user is to choose the correct answer. For example, if the type of the question template 114 is multiple choice, then more than one answer template 220 may be associated with the question template 114. For example, a question template 114 may be "How many points did % scorer % just make?" The associated answer templates 220 may include "0", "1", "2", "3", and "% pointsScored %" respectively. The "% pointsScored %" answer template 220 may be designated an answer instead of a possible answer.

As previously discussed, the quiz generator 102 may restrict which question templates 114 are retrieved from the database 104 based on whether variables in the question templates 114 are included in the metadata 112. The quiz generator 102 may also restrict which question templates 114 are retrieved based on whether variables in answer templates 220 are included in the metadata 112, where the answer templates are associated with the question templates 114.

For a given event, the number of generated questions 110 to be transmitted to the user devices, 204 and 206, may be less than the number of possible questions that the quiz generator 102 may be able to generate. In the general framework described above, the number of possible questions may correspond to the number of relevant question templates 114 that may be retrieved from the database 104. The number of generated questions 110 to be transmitted may depend on the number of user devices 204 and 206 currently receiving questions for a given event. In some examples, the same generated question 110 will be transmitted to each of the user devices 204 and 206 currently receiving questions for the given event. In different examples, the quiz generator 102 may transmit a different generated question 110 to each of the user devices, 204 and 206. In still other examples, the quiz generator 102 may distribute a determined number of generated questions 110 among the user devices, 204 and 206. Any algorithm for determining a subset of questions from a set of possible questions may be used. For example, the determination may be based on a random selection, the length of a desired quiz, a user's preference, a content provider's or event planner's preference, the number of answers received in the past to a particular question, and the number of answers received in response to questions transmitted for the given event.

A quiz may include one or more questions. A quiz may be generated from one event. Alternatively, a quiz may be generated from multiple events. The multiple events may be included in one piece of content 212 or span multiple pieces of content 212. For example, a quiz may include questions 110 generated from a series of games broadcasted during the course of a weekend.

The quiz generator 102 may be configured to manage generation and processing of quizzes, and transmission of results of the quizzes. The quiz generator 102 may provide a graphical user interface for such configuration. For example, the quiz generator 102 may include a web application server for this purpose. In another example, the quiz generator 102 may be configured through a Simple Object Access Protocol (SOAP) service. Additionally or alternatively, the graphical user interface may be used to display answers or comparisons of a user's answer with other users' answers.

The user management feature 210 may score quizzes and/or individual questions. Any method of scoring answers and/or quizzes now known or later discovered may be used. For example, the user management feature 210 may give a user a point for each correct answer. The user management feature 210 may determine and/or display scores after a user answers a question, after a user answers the questions in a quiz, and/or after the quiz generator 102 is able to determine the answers to a quiz and/or question. For example, a predictive question may have an actual answer only after the completion of an event. Scores may be displayed at the user device 204 and 206, e-mailed to users, and/or otherwise communicated to users.

Any method now known or later discovered of populating and/or updating a database may be used to populate the database 104 with question templates 114, answer templates 220, event types 116, and subject matter entries 118. For example, the quiz generator 102 may include a feature to generate a graphical user interface to permit a question author to create questions and answers or question templates 114 and answer templates 220. In another example, the quiz generator 102 may include a feature to generate a graphical user interface to permit entry of event types 116 and subject matter entries 118.

Consider the following example in the context of the example embodiment of the system 200 illustrated in FIG. 2. The content 212 may be an American football game broadcasted on television. Throughout the broadcast, the quiz generator 102 receives metadata 112 in a data stream from the broadcaster of the game. The metadata 112 may include rosters of each team in the game, individual and team passing and receiving yardage, score information, and current game situation (e.g., position on the field, what down the team is on, whether a call is being challenged, etc.). The database 104 may include football related statistics stored in subject matter entries 118 and football related questions in question templates 114. The subject matter entries 118 may include individual and team accomplishments, rosters of teams in a football league, records for individual game and career statistics in both individual and team categories, and current records of all teams in the league in relation to playoffs and championships.

During the football game, the quiz generator 102 generates questions 110 based on the metadata 112. Depending on the metadata 112 received, the quiz generator 102 may generate questions based on database entries stored in the database 104.

In some examples, the questions may be based on a numerical analysis performed on the metadata 112 and values of database entries. Examples of numerical analysis questions may include: "Will Team A come back to defeat Team B?"; "Will Player A finish with more rushing yards than Player B?"; "Will Player A be able to get more than 300 passing yards this game?"; and "Will Player A record a sack this game?"

Examples of numerical analysis questions may also include questions generated in response to a determined value exceeding a threshold value. The determined value may be the sum of a value included in the metadata 112 and another value retrieved from the database 104. One such generated question 110 may be: "Will player A rush for over 2,000 yards this season?" The threshold value may be 1,975 career rushing yards. The value included in the metadata 112 may be the number of rushing yards for a particular player on a play in a current game. The other value retrieved from the database 104 may be the particular player's total rushing yards this season prior to the play. Other examples of such questions may include: "Will Player A retire with the career rushing record?", "Will Politician P say the phrase 'time for a change' one more time during this speech?" and "Will Character C in this television show ask Character B to marry her again in this show?"

In other examples, the question may be opinion questions without any correct answer. Examples of opinion questions may include: "Who would you rather have on your team, Player A or Player B?"; "Should Team B punt the ball right now?"; and "Should Team A attempt a field goal right now?"

In still other examples, the quiz generator 102 may generate questions 110 that relate to the current state of a team's record in the context of other teams. Examples of such questions may include: "Will Team A make the playoffs?" or "Will Team A finish the season with more wins than Team B?"

In yet other examples, the question may be predictive questions. For example, "Will Lebron get a triple double?"; "Will Kobe foul out?"; or "What is the record for most points in a season?" Predictive questions may be handled differently than historical questions. For example, a predictive question may be handled as an opinion question. Alternatively or in addition, a predictive question may be handled as a historical question after enough time has passed to verify a prediction made by answering the predictive question. Question templates 114 may include an attribute indicative of a question type. The quiz generator 102 may handle a question differently based on the type of the question.

Questions may be generated in response to any configurable condition. For example, conditions may be configured for specific content, specific types of contents, a specific content supplier, a specific user, any other type of condition, or any combination thereof. For example, the system 200 may be configured to generate a quiz during each quarter of every football game broadcasted by a specific sports channel.

The quiz generator 102 may generate questions 110 at any time of the day without a subject matter expert being present to author the questions. Audience members may be more engaged in an event through interactivity provided by the generated questions 110. An event sponsor may monitor the relative interest in an event from the number of user answers 216 provided by audience members. The contents of the database 104 may be used and re-used for subsequent events making live event quizzing cost-effective for event sponsors and broadcasters.

The system 200 for generating questions and obtaining answers may be offered as a service to any party interested in quizzing and polling audience members. For example, service providers, cable providers, entertainment companies, sporting companies, television networks, and education institutions may potentially use the service without authoring any questions or installing software.

Social networking sites may sponsor competitions between its members based on quizzes managed by the system 200. For example, integration of the user management feature 210 of the quiz generator 102 with the user management functionality of a social networking site may permit members of the social networking site to participate in a competition related to a particular piece of content 212.

Figure 3:
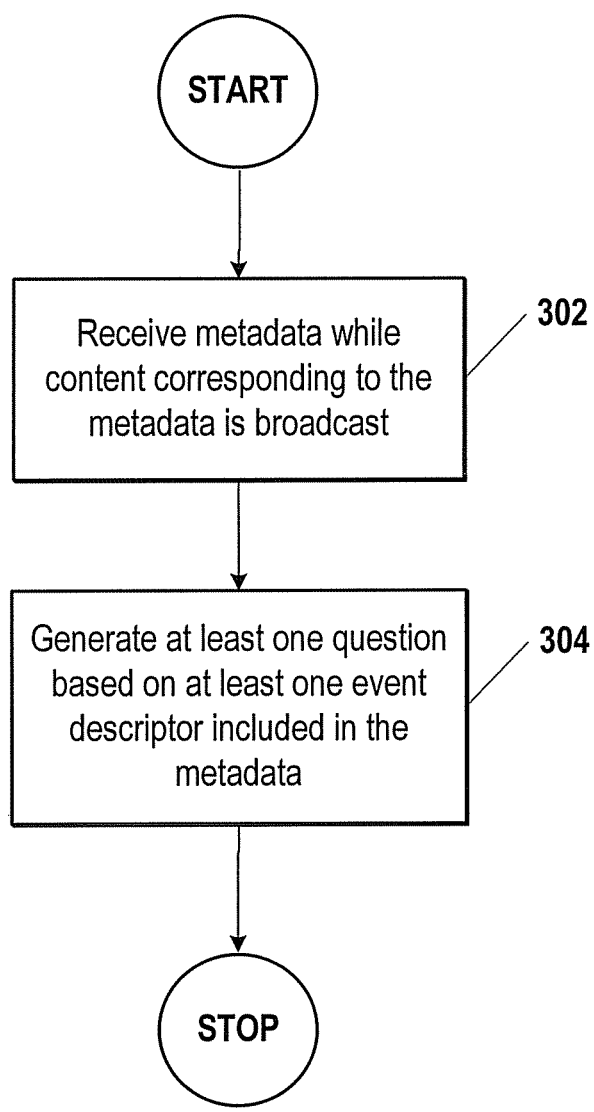
FIG. 3 illustrates one embodiment of a method for generating questions.

FIG. 3 illustrates one embodiment of a method included in a system for generating questions. Additional, different, or fewer acts may be performed.

In act 302 of the embodiment illustrated in FIG. 3, the operation may begin by receiving metadata while content that corresponds to the metadata is broadcast. In other examples, the metadata is received at a time different from when the content is broadcast. The metadata may include event descriptors that describe events included in the content.

In act 304, the operation may continue by generating at least one question based on at least one of the event descriptors.

Different components provide different functions for implementing quizzing functionality. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as the instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. An apparatus comprising:
    a memory; and
    a processor in communication with the memory, the processor configured to:
        receive metadata in a data stream as content is communicated in a media stream to a user, the data stream including a sequence of digitally encoded coherent signals, the metadata including a plurality of event descriptors, wherein the metadata is associated with the content and each of the event descriptors describes an event included in the content;
        receive a question template from a database;
        generate a question text of a question for the user from at least a word in the question template received from the database and at least a word in at least one of the event descriptors received in the data stream, the question text generated as the content is communicated to the user, wherein the question is a predictive question that has an actual answer known only after the event described in the at least one of the event descriptors completes; and
        generate the actual answer to the question based on the metadata that is received in the data stream after the event described in the at least one of the event descriptors completes, wherein a plurality of user answers are scored based on a comparison of the user answers with the actual answer.

2. The apparatus of claim 1, wherein the processor is further configured to:
    generate the question text of the question based on at least one parameter included in the at least one of the event descriptors, wherein the at least one parameter describes an aspect of the event described by the at least one of the event descriptors.

3. The apparatus of claim 1, wherein the at least one of the event descriptors includes at least one parameter, the database entry includes the question template, wherein the question template is associated with the at least one parameter in the database.

4. The apparatus of claim 3, wherein the processor is further configured to:
    replace a variable included in the question template with a value of another parameter included in the at least one of the event descriptors.

5. The apparatus of claim 3, wherein the processor is further configured to:
    replace a variable included in the question template with a value retrieved from the database.

6. The apparatus of claim 3, wherein the database includes a plurality of answer templates, the answer templates are associated with the question template, and the processor is further configured to:
    generate a plurality of possible answers from the answer templates, wherein the possible answers are included in the question.

7. The apparatus of claim 3, wherein the processor is further configured to:
    generate the actual answer to the question from an answer template based on the answer template being associated with the question template in the database.

8. The apparatus of claim 1, wherein the processor is further configured to:
    generate a plurality of questions from a plurality of question templates, wherein the question templates are associated with subject matter of the event described by each of the at least one of the event descriptors, the question templates include the question template, and the questions include the question.

9. The apparatus of claim 1, wherein the metadata is in extensible markup language format.

10. The apparatus of claim 1, wherein the processor is further configured to:
    convert the metadata from a first format to a second format, the question generated from the metadata in the second format.

11. Logic encoded in one or more tangible media for execution and when executed operable to:
    receive metadata in a data stream when content is communicated in a media stream to a user device, the data stream including a sequence of digitally encoded coherent signals, the metadata including a plurality of event descriptors, wherein the metadata is associated with the content and each of the event descriptors describes an event included in the content;
    generate a question text of a plurality of questions in a quiz from at least a word in a question template received from a database and at least a word in at least one of the event descriptors in response to receipt of the metadata in the data stream, the question text generated when the content is communicated to the user device, wherein the questions are predictive questions that each have a respective one of a plurality of actual answers that is known after the event described in the at least one of the event descriptors completes but that is unknown before the event described in the at least one of the event descriptors completes; and
    generate the actual answers to the questions based on the metadata that is received in the data stream after the event described in the at least one of the event descriptors completes, wherein a plurality of user answers received at the user device are scored based on a comparison of the user answers with the actual answers.

12. A method comprising:
    receiving metadata in a data stream with a processor of a quiz generator when content is communicated in a media stream to a user device, the data stream including data packets, wherein the metadata corresponds to the content, the metadata includes a plurality of event descriptors, and each of the event descriptors describes an event included in the content;

generating, when the content is communicated in the media stream to the user device, a question text of at least one question with the processor based on at least a word from a question template and at least a word from at least one of the event descriptors received in the data stream, wherein the at least one question has an actual answer that is known after the event described in the at least one of the event descriptors completes but that is unknown before the event described in the at least one of the event descriptors completes;

generating the actual answer to the at least one question with the processor based on the metadata received in the data stream after the at least one of the event descriptors is received in the data stream; and scoring a user answer based on a comparison of the user answer with the actual answer.

13. The method of claim 12 wherein generating the question text of the at least one question includes generating the at least one question in response to a determined value exceeding a threshold value, wherein the determined value is a sum of a first value included in the at least one of the event descriptors and a second value retrieved from a database.

14. The method of claim 12 wherein generating the question text of the at least one question includes generating the at least one question in response to a configurable condition.

15. The method of claim 12 wherein generating the question text of the at least one question includes limiting the at least one question to a determined question type.

16. The method of claim 12 further comprising:
updating at least one of a plurality of subject matter entries in a database based on the metadata received.

17. The method of claim 12 further comprising:
receiving a plurality of user answers to the at least one question from a plurality of user devices, the user answers comprising the user answer, the user devices comprising the user device; and
tabulating the user answers to determine results of a survey, where the survey includes the at least one question.

18. The method of claim 12 further comprising:
receiving the metadata while the content is broadcast.

19. The method of claim 12 further comprising:
receiving the data stream, wherein the data stream includes both the metadata and the content; and
separating the metadata from the content.

20. The method of claim 12 further comprising:
transmitting the question text to a user device that receives the media stream; and
receiving the user answer from the user device.

21. The method of claim 20 further comprising transmitting a score, which is determined by the scoring, to the user device for display.

* * * * *